United States Patent [19]

Chierici et al.

[11] 4,075,951
[45] Feb. 28, 1978

[54] SELF LUBRICATING CENTER BEARING LINER

[75] Inventors: Osvaldo F. Chierici, Elmhurst; Richard F. Murphy, Aurora, both of Ill.

[73] Assignee: Holland Company, Lombard, Ill.

[21] Appl. No.: 755,197

[22] Filed: Dec. 29, 1976

Related U.S. Application Data

[63] Continuation-in-part of Ser. No. 649,275, Jan. 15, 1976, abandoned.

[51] Int. Cl.² .................. B61F 5/16; B61F 5/50; F16C 17/04; F11C 33/66
[52] U.S. Cl. .................. 105/199 C; 308/137
[58] Field of Search .................. 105/199 C; 308/137

[56] References Cited
U.S. PATENT DOCUMENTS

| 3,405,565 | 10/1968 | Dilg | 105/199 C |
|---|---|---|---|
| 3,944,298 | 3/1976 | Cannon | 308/137 |

Primary Examiner—Johnny D. Cherry
Assistant Examiner—Howard Beltran
Attorney, Agent, or Firm—McWilliams & Mann

[57] ABSTRACT

A self lubricating liner for railroad car center plate assemblies comprising a bowl shaped member formed from an ultra high molecular weight polymer of dry self lubricating characteristics and shaped to define a floor portion and an upstanding side wall. The liner is stretch resistant and is received within the trunk bolster bowl on the floor of the bowl, it being proportioned to be fit on the bolster center plate and to entirely fill the space between the truck bolster bowl and the body bolster center plate 360° about the side wall of the bowl to preclude high energy impacts between these parts when coupler impacts and train line action are occasioned. The liner side wall is formed to be spaced from the top surfacing of the bowl side wall and make a tight seal about the neck of the bolster center plate. In use, the liner effects resurfacing action on the surfaces engaging same to make them effectively resistant against wear.

8 Claims, 6 Drawing Figures

U.S. Patent  Feb. 28, 1978  Sheet 1 of 2  4,075,951
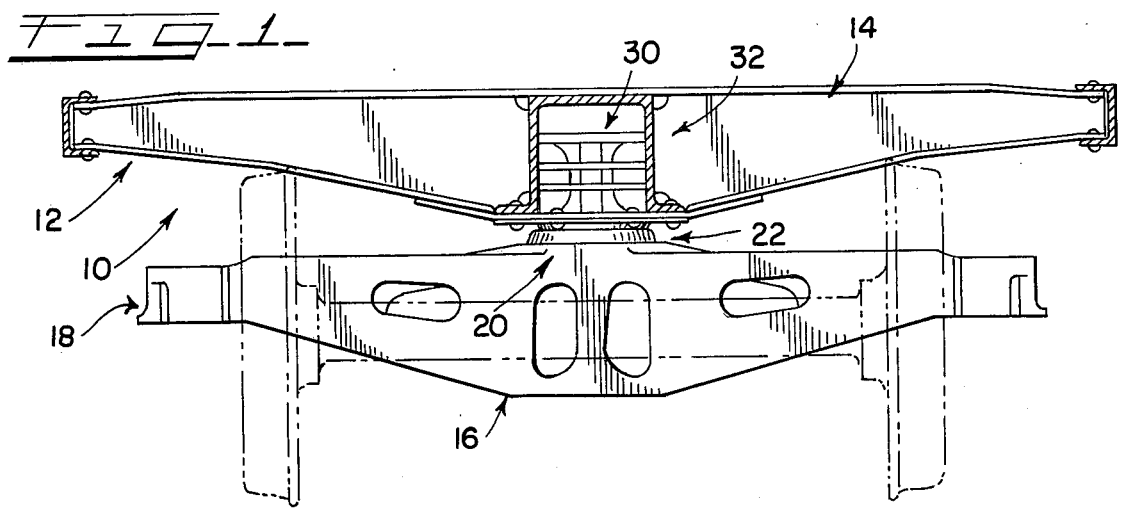
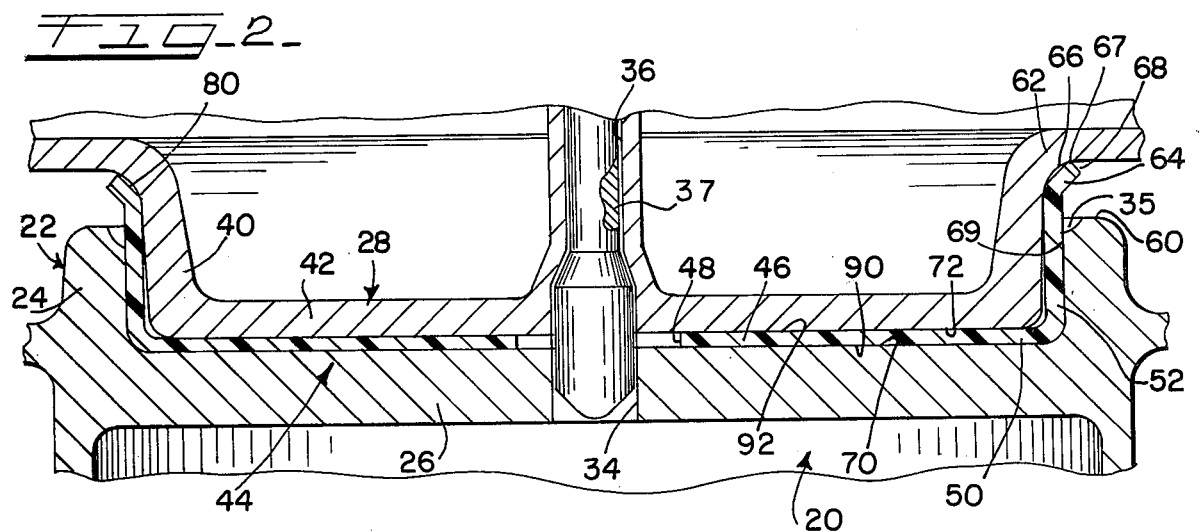
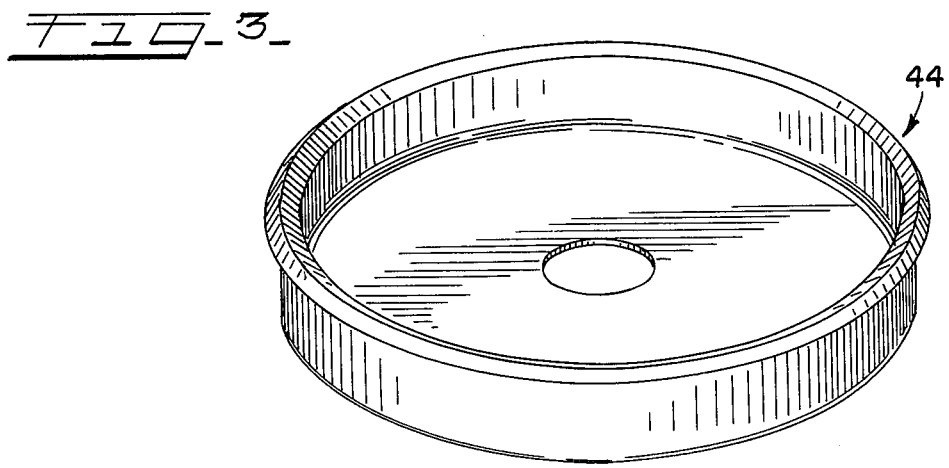

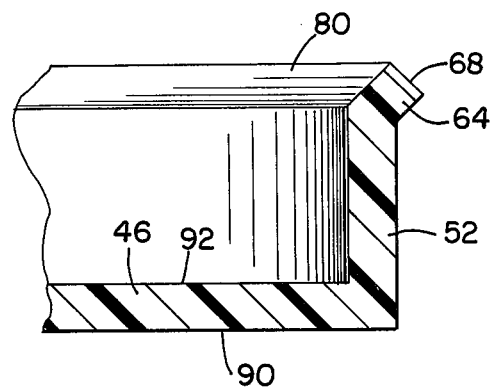
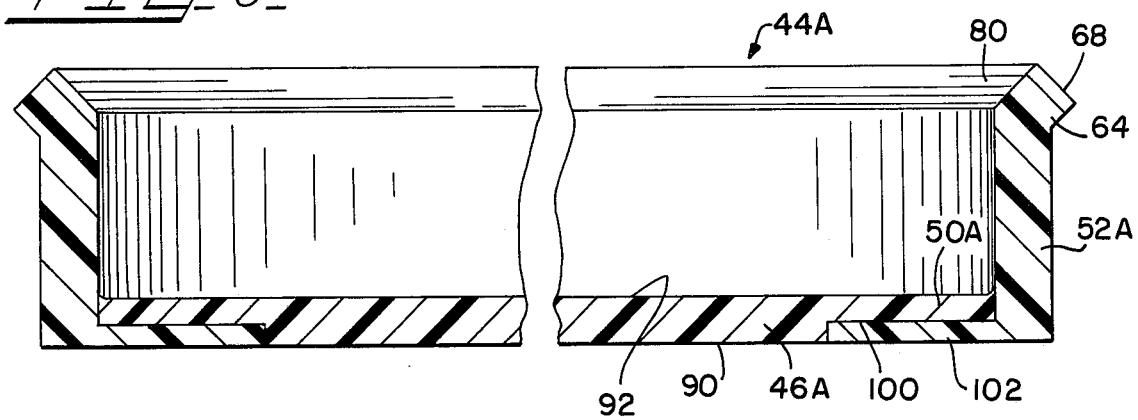
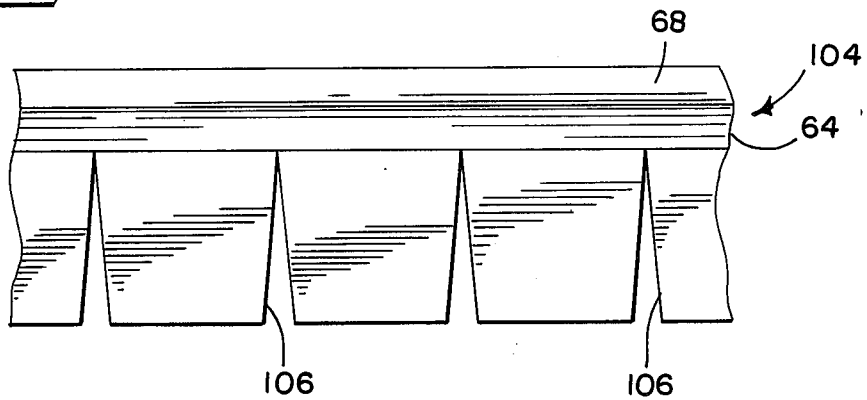

SELF LUBRICATING CENTER BEARING LINER

This application is a continuation-in-part of our abandoned application Ser. No. 649,275, filed Jan. 15, 1976.

The invention relates to a liner for railroad car center plate assemblies, and more particularly, to a liner for application between the car body bolster center plate and the car truck bolster bowl in which the body bolster center plate rests.

Railroad cars are commonly in the form of a body resting on and swively connected to a pair of trucks adjacent either end of the car. The swivel connection involved in each truck is generally formed by the car body bolster center plate resting on the truck bolster bowl, with these parts being pivotally connected by the conventional kingpin assembly.

It has been common practice to employ a manganese steel liner between the body bolster center plate and truck bolster bowl (see Car and Locomotive Cyclopedia, 1974 Edition at pages 513–25), with the hardness of the liner being relied on to provide the wear resisting characteristics desired. The resulting bearing arrangement involved requires frequent lubrication to insure adequate swivelling action, and when the liner is worn to the point where it must be replaced, the car has to be shopped for this purpose as this requires disassembly of the center plate assemblies to have access to the liner. In addition to the practical difficulties involved in center plate repair and maintenance as a result of employing the conventional manganese steel liner, even under the best of circumstances, it is difficult to insure that regular lubrication will be provided, which is essential for insuring the truck swivelling action that is required for the truck to freely move with respect to the car in following the track. Unfortunately, it not infrequently happens that the required lubrication is not applied, with the result that resistance to truck swivelling develops at the car center plate assemblies that can result in derailments.

A further problem encountered in connection with conventional center plate assembly liners is that when car body roll occurs, the body bolster center plate will tilt or cant correspondingly relative to the truck bowl, with the result that the liner is readily damaged. The liner and other center plate damage can also be attributed to the loose fit that the body bolster center plate has within the liner, there normally being a spacing of approximately one-eighth – three-sixteenths of an inch between the steel liner side wall and the bolster side wall. This results in high energy impacts of the body bolster center plate against the liner and bolster bowl especially at the portions of same located at the car longitudinal centerline (the six and twelve o'clock positions) when end of car impacts and trainline action is occasioned. Experience has shown that in normal use the liner side wall or sleeve all too readily breaks up with the resulting fragments getting between the liner floor and the center plate, thereby causing undue wear on the liner floor as well as the bolster bowl. Furthermore, as the bolster center plate and bowl wall act against each other with a near point or line bearing engagement at impact transmitting positions, the bowl wall is eventually forced out of round, especially at the six and twelve o'clock positions, and all too frequently this is followed by fracturing of the bowl side wall.

A principal object of the present invention is to provide a liner for railroad car center plate assemblies that not only is formed from a dry self lubricating material, which avoids the aforementioned lubrication problem, but which also establishes two slip surfaces, one on either side of the liner, that insures adequate truck swivelling action even under severe operating contingencies, and further provides for a wear resisting resurfacing of the metal surfaces engaged by same.

Another principal object of the invention is to provide a liner that is proportioned to fully fill the space between the body bolster center plate and bowl, around the side wall of the bowl, for spreading the application of the forces of impact to the bowl side wall 180 degrees thereabout.

Another important object of the invention is to provide a bowl liner that is formed from a material that resists distension and compaction of the liner walls under stress, so as to avoid high stress energy impacts of one center plate component against the other.

Other objects of the invention are to provide a center plate assembly that is self lubricating, that resists displacement of the liner without the liner being bonded to either bolster center plate component, that is shaped to avoid damage to the liner when the car body rocks in service, and that avoids the need to machine the bowl of new truck bolsters in making application of the assembly, and to provide a self lubricating liner for center plate assemblies that is economical of manufacture, convenient to install, and long lived in operation.

In accordance with the present invention, the liner is in the form of a bowl shaped member formed from an ultra high molecular weight polymer of dry self lubricating characteristics (a molecularly oriented polyethylene is preferred) and is shaped to define a floor portion and an upstanding side wall, which side wall is proportioned to fully fill the space between the body bolster center plate and bowl side wall, about the bowl side wall. The material from which the liner is formed resists adherence thereto of foreign matter, and is resistant to distension (or stretching) and compaction under compressive forces, and thus holds the truck bolster bowl side wall in spaced relation from the body bolster center plate. The liner side wall is shaped to be spaced from the bowl side wall top surfacing, to avoid damage to the liner when car body roll occurs, and to firmly engage the neck of the body bolster center plate for effecting a firm seal thereabout against entry of foreign material between the liner and the bolster center plate. The liner is arranged for application to center plate assemblies without requiring machining of either the center plate or bowl.

The liner has an initial coefficient of sliding or dynamic friction with respect to the body bolster center plate and truck bolster bowl of about 0.02, and is arranged to establish slip surfaces on either side of same, the outer of which is the normal slip surface between the center plate components of the assembly, and the inner of which is a contingent slip surface in the event that under severe operating contingencies the liner is temporarily fixed against swivelling movement with respect to the bowl.

An important aspect of the liner is that in service it effects a resurfacing of the surfaces it engages to effectively preclude further metal wear. A further important aspect of the liner is that impact forces transmitted through are spread over 180 degrees of the bowl and bolster center plate side surfacing involved whereby overstressing of the center plate assembly components involved is avoided.

Other objects, uses, and advantages will be obvious or become apparent from a consideration of the following detailed description and the application drawings, in which like reference numerals indicate like parts throughout the several views.

In the drawings:

FIG. 1 is a diagrammatic transverse cross-sectional view through a railroad car body underframe at one of its body bolsters, showing some parts of same and the supporting truck bolster in elevation, with the truck wheels being shown in phantom and the truck side frames omitted for ease of illustration;

FIG. 2 is a fragmental vertical cross-sectional view through the center plate assembly shown in FIG. 1 illustrating one arrangement of the center plate components and self lubricating liner in accordance with this invention;

FIG. 3 is a perspective view of the liner;

FIG. 4 is a fragmental vertical sectional view of the liner of FIG. 3 showing same as separated from the center plate assembly;

FIG. 5 is a vertical sectional view through a two piece liner embodying the invention, with parts broken away; and FIG. 6 is a plan view illustrating the component from which the liner side wall of FIG. 5 is formed.

However, it is to be distinctly understood that the specific drawing illustrations provided are supplied primarily to comply with the requirements of the Patent Laws, and that the invention is susceptible of other embodiments that will be obvious to those skilled in the art, and which are intended to be covered by the appended claims.

Reference numeral 10 generally indicates a railroad car in diagrammatically illustrated form and shown to comprise car body underframe 12 having a car body bolster 14 resting on and swivelly connected to truck bolster 16 of railroad car truck 18. The truck 18 and its bolster 16 are of any conventional type and thus are only diagrammatically illustrated.

The connection of the car body bolster 14 to the truck bolster 16 is effected utilizing center plate assembly 20, which in accordance with the present invention comprises truck bolster bowl 22 (see FIG. 2) that is integral with the bolster 16 and defines upstanding side wall 24 and floor wall 26, in which is received body bolster center plate 28 that in the form shown is integral with center filler 30 suitably fixed to the underframe center sill 32 for forming the "center plate" of body bolster 14. As is conventional, the truck bolster bowl floor 26 and center plate 28 are apertured as indicated at 34 and 36, respectively, to receive the conventional kingpin 37 (only a fragment is shown) that swiveably connects these components together. Bowl 22 and center plate 28 are of standard shaping, and thus bowl wall 24 is shown to include the usual recessed edge 35 that normally functions to receive welding material for welding the conventional manganese steel liner to the bowl 22. Edge 35 serves no function in the practice of this invention but also does not interfere with the practice of the invention. In practicing this invention both bowl 22 and center plate 28 may be considered to be free of any preliminary machining and thus may be used as cast or as otherwise formed in accordance with standard manufacturing procedures.

The body bolster center plate 28 comprises a depending side wall 40 that is integral with planar wall portion 42 that seats within the bolster bowl 22. As is well known in the art, the center plate 28 may be a separate component, or part of a separate component suitably fixed to the center sill 32 and/or the body bolster 14, or plate 28 may be an integral part of bolster 14 or parts of same.

In accordance with the present invention, a liner 44 of special characteristics is interposed between the body bolster center plate 28 and the side wall 24 and floor 26 of the bolster bowl.

In the form of FIGS. 2 - 4, the liner 44 is of dished, bowl like configuration, and comprises a floor or disc portion 46 of rounded configuration that is apertured at 48 to receive the aforementioned conventional kingpin. The liner 44 about the outer margin 50 of its floor disc portion 46 includes upstanding side wall 52 that is in circumambient relation thereabout and that is continuous and uninterrupted about its circumference, as indicated in FIG. 3.

The liner 44, in accordance with the invention, is defined by a high density polymer of dry self lubricating characteristics that is pliable but non-stretchable and is thus free from distending or stretching characteristics and that is sufficiently compaction resistant to resist any substantial compaction under compressive forces up to its elastic limit, and has a high degree of elastic memory for full return to original shape after being stressed, up to its elastic limit.

Pursuant to the invention the liner 44 is formed from ultra high molecular weight (UHMW) polyethylene having a molecular weight in the range of from about 3 million to about 9 million. In specific embodiments of the invention conforming to this invention the liner 44 was made from the molecularly oriented UHMW polyethylene marketed by Ketrol Enterprises (of York, Pennsylvania) under the trademark TUFLAR (grade PL), which is the specific material preferred for practicing the invention; such material as shaped to define liner 44, conforms to the characteristics specified in this application, and thus has, among other aspects, a high degree of toughness and long wearing characteristics, in addition to being self lubricating. This material is also receptive to fillers in the form of glass, clay, sand, suitable fabrics, and alumina for modifying same to adapt the liner for specific conditions.

The invention further contemplates that the liner side wall 52 and floor portion 46 are proportioned to fully fill the space between the truck bolster bowl and the body bolster center plate that would permit any lost motion movement of the center plate 28 relative to bowl 22 in the plane of these components. Thus, the side wall 52 of liner 44 is proportioned to fill the space between the bowl side wall 24 and the body bolster center plate side wall 40 to the extent that bowl wall 24 holds the liner 44 against movement in the plane of bowl 22, and liner 44 holds center plate 28 against movement in the same plane. Of course, the liner 44 is not closed across the aperture 48 so as to permit application of the aforementioned conventional kingpin, and, as indicated in FIG. 2, liner 44 need not have the inner surfacing along floor 46 or wall 52 fully complement the normal tapered external surfacing of center plate 28 at the lower portion of its wall 40. It is only necessary that the liner wall 52 have a thickness such that at the upper level of bowl wall 24, just below recess 35, the liner wall 52 fully fills the space between center plate wall 40 and bowl wall 24, so as to preclude movement of the center plate 28, relative to bowl 22, in the plane of center plate assembly 20.

As indicated, as the liner 44 fills the space between the truck bolster bowl wall 24 and body bolster center plate wall 40 so as to preclude lost motion movement between the two (in the plane of assembly 20), and as liner 44 is formed from a material that resists distension or stretching, and any substantial compaction due to compression (up to its elastic limit), liner 44 holds these components firmly spaced apart and against forces, and especially impact forces, tending to impact the body bolster side wall 40 and the bolster bowl side wall 24 together, especially at the assembly 6 and 12 o'clock positions, as when end of car impacts and train action are occasioned.

Furthermore, the impact forces involved are transmitted through the liner wall 52 with force application over 180 degrees of the respective bowl and center plate walls 52 and 40 that are involved. Thus, for impacts acting longitudinally of the car (which are the primary source of damage to conventional center plate assemblies), the forces transmitted to the center plate and bowl walls 40 and 52 are spread in application to ninety degrees either side of the car longitudinal center line, rather than being concentrated at the center plate assembly 6 and 12 o'clock positions. This avoids high energy impacts or stressing acting on the body bolster center plate and truck bolster bowl side walls that otherwise may destructively damage them as well as damage or displace the liner 44. Where compressive forces acting on the liner 44 are sufficient to cause some minor compaction or deformation of the liner walls within the elastic limit of the liner, the high elastic memory of the liner material involved restores the liner to original shaping when such stress is removed, to keep the space between the two center plates 22 and 28 fully filled by the liner 44 (except, of course, at the liner opening 48) to the extent that lost motion movement of these components in the plane of assembly 20 is precluded.

Further in accordance with the invention, liner wall 52 does not seat in any way on the top surfacing 60 of the bowl 22 or its recess 35, but rather rises straight out of the bowl interior for firm engagement with the neck portion 62 of center plate wall 40, 360° thereabout, so as to effect a seal about the center plate neck portion 62 that precludes entry of foreign material into between the liner 44 and center plate 28. In the form shown, liner wall 52 is formed with outwardly flared flange 64, that is inclined at approximately 45° with respect to wall 52, which makes a dual line sealing contact with the center plate neck portion 62, as at 66 and 67. Flange 64 terminates in a dust deflecting edge 68.

The spacing of the liner wall 52 and its flange 64 free of engagement with the bowl top surfacing 60 and recess 35 insures that the liner will sit flat on the bowl floor 26 so that the center plate 28 will not be precluded from resting at a proper level well within bowl wall 24. Also, when rocking of the car body with respect to the truck bowl 22 occurs, pinching off of the upper portion of liner wall 52, due to the center plate neck portion 62 rocking toward the bowl top surfacing 60, with a scissors like effect, will be avoided.

The liner 44 in being formed of the indicated dry self lubricating material eliminates the need for applying separate lubricating materials to the center plate assembly 20, which in turn permits the center plate and bowl area of the car to be free of wet type lubricants that are customarily used for this purpose and that so readily accumulate wear inducing foreign matter.

The liner 44, in accordance with the present invention, forms a two slip surface arrangement in the center plate assembly 20, which insures the needed swivelling action of the car trucks 18 with respect to the car body 12. The normally functioning slip surface is that indicated at 70 between the liner 44 and the bolster bowl side wall 24 and floor 26. However, the liner 44 also forms a secondary contingency slip surface 72 between the liner 44 and the planar wall 42 and side wall 40 of the body bolster center plate 28.

The liner 44 is in no way bonded to either the truck bolster bowl 22 or the body bolster center plate 28. When the truck bolster swivels with respect to the car body in following the track, the swivelling action is normally at the slip surface 70, with the liner 44 thus remaining stationary with respect to the body bolster center plate 28. However, should the liner 44, due to special circumstances during train operation become so clamped between the bolster bowl side wall 24 and the body bolster center plate side wall 40 that the needed swivelling action does not occur at the slip surface 70, the swivelling action does occur at the contingency slip surface 72, with the liner then remaining stationary with the truck bolster bowl under the contingency circumstances indicated. Even under such circumstances as these, after the stress involved is relieved, the spacing of the truck bolster bowl wall 24 and body bolster center plate side wall 40 remains the same due to the ability of the liner to resist stretching and compaction under stress, and to restore itself to original dimensioning by its high degree of elastic memory.

As the side wall 52 of the liner 44 serves to firmly space the body bolster center plate side wall 40 from the bowl side wall 24 in lost motion precluding relation thereto, there is no need for the application of any further seal about the bowl top surfacing 60 or recess 35 to preclude foreign matter from having access to the bearing surfaces of the center plate assembly. This is because the firm engagement of liner wall 52 with bowl wall surface 69 provides the needed seal against foreign matter entry at this area of assembly 20.

The liner 44, further in accordance with the invention, preferably has a coefficient of sliding or dynamic friction with respect to the surfaces of the body bolster center plate 28 and bolster bowl 22 that the liner engages of about 0.02, and the preferred material indicated provides such a coefficient of friction relationship. As indicated hereinafter, it is a feature of the invention that this low coefficient of friction will further reduce as car 10 is used in service.

The liner 44 is preferably applied to the center plate assembly 20 by having the liner 44 initially applied to the truck bolster bowl 22, prior to the car body being applied to the trucks 18. When the body of the car is applied to the truck bolsters 18, the body bolster center plates 28, on the body being lowered into place on the car trucks, are guided by the flared surface 80 of liner flange 64. When the body rests on the car trucks, the liner 44, in the case of each center plate assembly 20, is seated on the floor wall 26 of the respective truck bowls 22, and well within the side walls 24 of same. As the respective body bolster center plates now rest on the respective truck bolster bowl floors, through and on top of the respective liners 44, the body bolster center plates and truck bolster bowls will now serve as the swivel bearings between the respective car trucks 18 and body 12. Application of the usual kingpin assembly, which may be entirely conventional insofar as the present invention is concerned, effects the usual securement of the car body to the trucks 10.

The liner 44A of FIGS. 5 and 6 is of two piece construction comprising a floor or disc portion 46A that is apertured (not shown) in the same manner as the corresponding portion 46 of liner 44 (to receive the kingpin 37), and has its outer margin 50A recessed or indented thereabout, as at 100, to receive and rest on the flange portion 102 of side wall 52A. Side wall 52A in this embodiment of the invention is in strip form cut to fit a particular bolster bowl from bar stock 104 in the rectilinear form of FIG. 6 having the transverse section indicated in FIG. 5, of which flange portion 102 is segmented as at 106 so that the resulting strip 106, after being cut to the length that will fit within the bolster bowl 22 selected to provide a liner side wall 52A fitting within the bowl 22 in the manner illustrated for liner 44, may be flexed as needed to so apply same to the bolster bowl in question. The liner floor or disc portion 46A is seated in place on flange portion 102 as indicated in FIG. 5 to complete the assembly, in which condition the spaces between the segments of the liner side wall 52A are substantially closed or reduced in size by the arcing applied to side wall 52A to fit same into place. Liner 44A is otherwise the same as liner 44 (corresponding reference numerals indicating corresponding parts) and functions in the same manner as liner 44. Thus, liner 44A may be substituted for liner 44, assuming liner 44A is formed to fill bowl 22 of FIG. 2.

As has been indicated, the liner arrangement of this invention has provided several unexpected benefits.

For instance, the liner of this invention has been found, in use, to be characterized by effecting on the metal surfacing on which it rides a polishing or honing resurfacing action such that, after a period of normal use, the center plate and bowl surfacing in question takes on a mirror-like finish whereby the wear surfaces of the center plate assemblies in question become effectively resistant against further wear. What appears to happen is that as the swivelling at the center plate assemblies occurs (ordinarily at slip surfacing 70), the polymer material of the liner tends to fill up the pores and level irregularities in the metal surfacing involved, so that the surfacing of the bowl and center plate engaged by the liner 44 becomes partially formed and defined by transferred polymer material from the liner 44. As the center plate assembly swivelling action normally occurs at slip surfacing 70, the resurfacing action is effected primarily at this location, and thus along the inner surfacing of bowl 22 about its wall 24 and floor 26.

Metal worn off the center plate and bowl, during the polishing action in question, seems to embed itself in the liner wear surface 90 involved. Any foreign matter that is caught between the bowl and center plate also becomes embedded in the liner surfacing 90, and thus is positioned to avoid any wearing action on the bowl wear surfaces involved. As indicated, since the material from which the liner is made resists adherence thereto of foreign matter, such foreign matter does not accumulate on the liner where it is exposed, and it is only grit and the like that may become trapped between the liner surfacing 90 and the center plate and bowl surfaces it engages that is subject to the foreign matter embedding action indicated.

As the swivelling action at the center plate assemblies 20 normally occurs at slip surface 70, it is ordinarily at the bowl floor and side wall surfaces, that are contacted by the liner 44, that this resurfacing action is maximized, though the same resurfacing action takes on center plate 28 where liner wear surface 92 engages same to the extent that slip surface 72 functions as such. Any small amount of foreign material which works its way beyond seal areas 66 and 67 into the area of liner surfacing 92 is subject to the foreign matter embedding action that has been referred to with reference to liner surfacing 90. This resurfacing action is one reason why the liner of this invention may be utilized in connection with new center plate assembly equipment without requiring machining of the wear surfaces involved. The resulting resurfacing also means that the coefficient of sliding friction at the slip surface in question tend to decrease even below 0.02 as the polymer builds up on the metal surfaces involved.

Another benefit provided by the practice of the invention is that as foreign matter becomes embedded in the liner, the thickness of the liner tends to enlarge, thus providing a self compensating effect making up for such wear or attenuation as there is on the liner wear surfaces, due, for instance, to the aforementioned resurfacing action.

Further, it has been found that the wear surfaces 90 and 92 of the liner tend to work harden in use, thus increasing their ability to resist wear. This is also true of the polymer material transferred to the bowl and center plate surfaces contacted by the liner, thus further minimumizing wear at these important load surfaces.

These various wear resisting aspects of the invention apparently contribute to the significant result provided by the invention, as shown by operating experience, namely that in use the center plate assembly metal surfacing engaged by liner surfaces 90 and 92, as well as the liner itself, become effectively wear resistant.

As the material from which the liner is made has dry self lubricating characteristics and resists adherence thereto of foreign material, the abrasive effect of foreign matter is that usually found in equipment of this type, especially where wet type lubricants are employed, will be largely avoided, with any trapped foreign matter becoming embedded in the liner. The term "foreign matter" in this regard means the dirt, grit, dust, road bed particles and the like that under the car equipment is exposed to in service, as is well known in the art.

When the car is subjected to longitudinal impacts, as are occasioned by end of car impacts and trainline action, the impact forces involved are transmitted through the center plate assemblies 20 over 180° of such assemblies, thus avoiding stress concentrations at the center plate assembly six and twelve o'clock areas areas that so often throw out of round and frequently fracture truck bolster bowls of conventional center plate assemblies. When car body roll occurs, with its consequent relative movement between the center plate assembly bowl and center plate, the liner acts as a protective shielding covering for the bowl.

These factors all contribute to virtual elimination of car "down" time due to center plate assembly malfunctions, which results in the alleviation of a major maintenance problem of the railroads. Repair of car center plate assemblies is one of the most expensive functions a railroad must perform on its cars, as not only must the car be taken out of service to remove the car body for access to the car center plate areas, but also special tools and torches are required to correct wear problems. Furthermore, the repair and replacement of body bolster center plates, in and of themselves, is a time consuming and expensive operation due to the nature of center plate construction. The liner body bolster center plate seal provided by this invention is effective in protecting the body center plate both from corrosion and abrasion.

Furthermore, the liner of the invention when the car is operating absorbs the energy of impacts against it due to car component movements relative to it, and in avoiding metal to metal contact between basic parts of the center plate assembly, it acts as a sound deadener. This is of major significance in connection with caboose cars for rider comfort.

The high molecular weight range specified for the liner material employed insures the high strength, wear resisting, self lubricating, low coefficient of dynamic friction characteristics that are desired for this invention while at the same time providing a material that resists flow under significant unit pressures and yet is sufficiently workable in nature to permit formation, by molding or other shaping procedures, of the product shape desired.

It will therefore be seen that the invention provides a one piece center plate assembly liner of dry self lubricating material and of unique one piece construction which avoids the application of high energy impacts directly to the thrust resisting walls of the body bolster center plate and the truck bolster bowl, and also provides a contingency swivel slip surface within the center plate assembly as well as a primary swivel slip surface. Considering the coefficient of friction relationships involved and the primary and contingency slip surfaces provided, it will be clear that the needed swivelling action of the car trucks with respect to the car body will be maintained thereby avoiding derailment problems of conventional center plate assemblies. The significantly improved swivelling action provided when the invention is employed can be expected to materially contribute to fuel savings by railroads due to reduced power requirements to move a train of which the cars are center plate equipped in accordance with this invention.

The foregoing description and drawings are given merely to explain and illustrate the invention, and the invention is not to be limited thereto, except insofar as the appended claims are so limited, since those skilled in the art who have the disclosure before them will be able to make modifications and variations therein without departing from the scope of the invention.

We claim:

1. In a center plate arrangement for railroad cars having a car body riding on car trucks, with the center plate arrangement being centered on the car longitudinal center line and including at each truck a body bolster having a center plate, including a neck at its junction to the body bolster, and a truck bolster having a bowl swivelly receiving and supporting the body bolster center plate for swivelling movement about the truck pivot axis, and a liner received in the bowl and between the bowl and the body bolster center plate, said bowl defining an upstanding side wall thereabout defining at its upper edge the top surfacing of the bowl, and said body center plate defining a depending wall external side wall thereabout proportioned to fit within the bowl side wall and provide shiftable lost motion about the truck pivot axis in the plane of the bowl, the improvement wherein:

the liner is formed from a dry self lubricating polymer material that is distension free, with the liner being of bowl configuration and defining a floor on which the body bolster center plate rests, and an upstanding side wall in circumambient relation about the bowl floor and received about the body bolster center plate and between the side wall of same and the truck bolster bowl side wall and in physical engagement with both the center plate and bowl side walls about the truck pivot axis, and with the liner being proportioned in the portion of same that is interposed between the body bolster center plate side wall and the truck bolster bowl side wall to space the body bolster center plate side wall from the bowl side wall with a movement restraining connection therebetween in the plane of the bowl thereabout whereby longitudinal impacts acting on the car body are transmitted through the center plate side wall arrangement over a substantial portion of said side wall on either side of the car longitudinal center line, with the liner side wall being free of tension acting longitudinally of said axis, and defining at its upper end rim surfacing that is spaced from and free of engagement with the bolster bowl top surfacing, said liner and bowl defining a first normally operative slip surfacing whereby the bowl swivels relative to the liner and the body bolster center plate, on swivelling of the car truck relative to the car body, said liner and the body bolster center plate defining a second contingency slip surfacing, whereby when said first slip surfacing is rendered temporarily restrained by said liner being clamped between said center plate and bowl side walls, the bowl and liner will swivel relative to the body bolster center plate at said second slip surfacing, on swivelling of the car truck, under such conditions, relative to the car body, said liner being characterized by having the polymer material surface portions of same that engage the bowl and body bolster center plate to form said slip surfacing effecting during use of the assembly resurfacing of the portions of said center plate and bowl engaged thereby for reforming said center plate and bowl portions to have a wear free mirror finish.

2. The improvement set forth in claim 1 wherein:
the material from which the liner is formed is further characterized by being resistant to adherence thereto of foreign matter.

3. The improvement set forth in claim 2 wherein:
said material is polyethylene having a molecular weight in the range of from approximately 3,000,000 to approximately 9,000,000.

4. The improvement set forth in claim 1 wherein:
the side wall of the liner has its upper end in sealing contact relation with the body bolster center plate about the truck pivot axis above and spaced from the bolster bowl top surfacing, and at the neck of the body bolster center plate.

5. The improvement set forth in claim 1 wherein:
said center plate and bowl are free of machining, and said liner floor and side wall substantially conform to the internal configuration of said bolster bowl and its side wall.

6. The improvement set forth in claim 4 wherein:
said liner upper end is outwardly flared and its rim surfacing defines foreign matter deflecting surfacing.

7. The improvement set forth in claim 1 wherein:

said polymer material is characterized by effecting embedding therein of foreign matter trapped in said slip surfacing whereby wearing of said liner at said slip surfacing is thickness compensated for.

8. A liner for application in its operative position between a body bolster center plate and a truck bolster bowl of a railroad car center plate assembly, with the bolster bowl having a floor for supporting the center plate and a side wall in circumambient relation to the bowl floor, said liner comprising:

a dished member formed from a molecularly oriented ultra high molecular weight high density polyethylene having a molecular weight in the range of from about 3,000,000 to about 9,000,000, said member being of bowl configuration and defining a floor on which the body bolster center plate is to rest in the operative position of the liner, and an upstanding side wall in circumambient relation about said floor, said member being distension resistant and having its side wall thickness proportioned to space and hold the bowl and body bolster center plate against relative lost motion movement about and parallel to the plane of the body bolster center plate in the operative position of said liner, said member floor and side wall being proportioned for seating of said member floor directly on the bowl floor with said member side wall free of vertical support by the bowl side wall, when the body bolster center plate rests on said member floor in the operative position of said member, said liner being characterized by having the surface portions of same that engage the bowl and body bolster center plate effecting during use of the assembly resurfacing of the portions of said center plate and bowl engaged thereby for reforming said center plate and bowl portions to have a wear free mirror finish.

* * * * *